R. R. BALL.
Stove-Pipe Coupling.
No. 160,296.    Patented March 2, 1875.
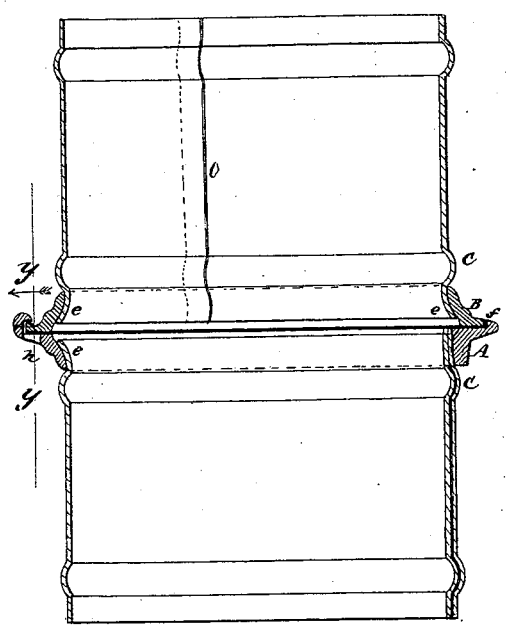
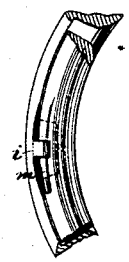
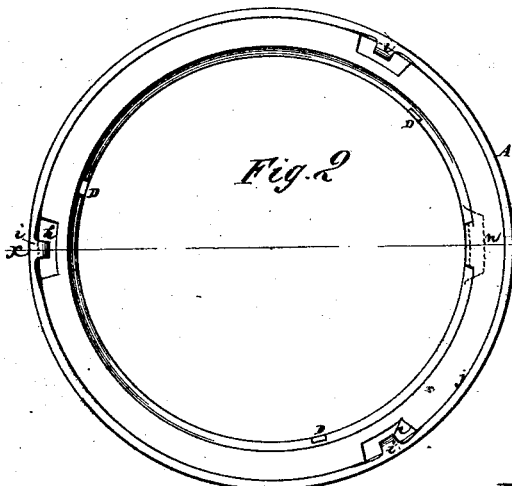
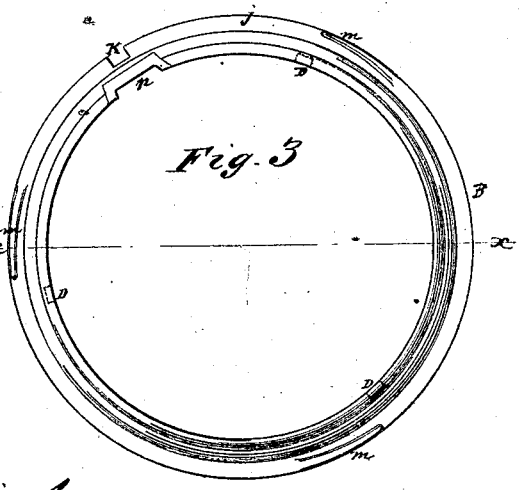

UNITED STATES PATENT OFFICE.

ROBERT R. BALL, OF WEST MERIDEN, CONNECTICUT.

IMPROVEMENT IN STOVE-PIPE COUPLINGS.

Specification forming part of Letters Patent No. 160,296, dated March 2, 1875; application filed December 12, 1874.

*To all whom it may concern:*

Be it known that I, ROBERT R. BALL, of West Meriden, New Haven county, Connecticut, have invented a new and useful Improvement in Stove-Pipe Couplings, of which the following is a specification:

The invention will first be fully described, and then pointed out in the claim.

Figure 1 is a sectional elvation of the pipe and coupling, taken on the line $x$ $x$ Figs. 2 and 3. Fig. 2 is a section of Fig. 1 looking in the direction indicated by the arrow from the line $y$ $y$; and Fig. 3 is a top view of a portion of the coupling, showing one of the hooks and a hole or slot through one part of the coupling in dotted lines.

Similar letters of reference indicate corresponding parts.

This coupling is made of two parts, A and B, which are attached to the ends of two joints of pipe, substantially as seen in Fig. 1. Beads C C are made near the ends of the pipe, and the parts A B are slipped over the ends and down to the beads, where the ends of the pipe are turned down with the peen end of a hammer. D represents little lugs on the inside of the parts at three, more or less, places, over which the sheet-iron ends are bent. These lugs prevent the pipe turning, and suffice to hold the coupling and pipe together, but they are not a very important part of the invention, as when the ends of the pipe are turned or battened down, as seen at $e$ $e$ in Fig. 1, there is little danger of their turning or getting loose. The part B of the coupling fits within the shoulder $f$ of the part A. $h$ are holes or slots in the part A, and directly over the slots and above the shoulder $f$ are hooks $i$. There are three, more or less, of these hooks and slots. By means of these slots or holes the hooks $i$ can be cast on the part A of the coupling, and leave their own core when drawn from the sand. The part B of the coupling is made with a surrounding flange, $j$, and the two parts of the coupling are held together by the hooks $i$ over the flange, as seen in Fig. 1. To make the hooks available for this purpose a slot, $k$, is made in the flange $j$. The flange is slipped under any two of the hooks, and the slot $k$ slips over the other hook, which brings the faces of the two parts of the coupling in contact, and allows the part B to be turned, so as to carry the slot $k$ from the hook. $m$ represents inclined planes on the top of the flange $j$, which, as the part B is turned around, pass under the hooks and draw the parts of the coupling tightly together, thus making the two joints of pipe rigid and strong. $n$ represents a recess in the coupling for admitting the joint O in the pipe.

This coupling utilizes the entire length of the stove-pipe, saving about three inches in each joint. It locks firmly together and holds the pipe perfectly straight and rigid either in an upright or horizontal position, and makes it self-supporting, doing away entirely with wire or other supports. With this coupling the pipe can be put up and taken down as fast as the joints can be handled.

The coupling is ornamental, and adds but a trifle to the cost of the pipe.

I am aware of the stove-pipe coupling now in use, and having the same general application, but it is too expensive for practical use on account of the difficulty which attends the casting of it. The circumferential groove necessitates a core, which is difficult to manipulate and requires the most skilled workmen, while the loss by blowing and breaking the core is fully thirty per cent. Every tinner must have a standard roll in order to be able to bead the pipe into the collars. On the other hand, my apertured hooks allow me to cast the ring without a core, the pattern making its own green sand core, and to have the whole operation performed by a common workman.

What I claim is—

A stove-pipe coupling having shoulder $f$, slots $h$, hook $i$, and slotted inclined flange $j$ $k$ $m$, as shown and described.

ROBERT R. BALL.

Witnesses:
T. B. MOSHER,
ALEX. F. ROBERTS.